United States Patent [19]

Essington

[11] 3,945,370

[45] Mar. 23, 1976

[54] BURNER

[76] Inventor: Harry M. Essington, P.O. Box 4174, Coronado Station, Santa Fe, N. Mex. 87501

[22] Filed: Aug. 7, 1974

[21] Appl. No.: 495,405

[52] U.S. Cl. .... 126/271.3; 126/271.1; 126/271.2 A
[51] Int. Cl.² .......................................... F23B 3/00
[58] Field of Search....... 126/271.1, 271.2 C, 271.3, 126/271.2 A; 47/1.44

[56] References Cited
UNITED STATES PATENTS

| | | | |
|---|---|---|---|
| 145,822 | 12/1873 | Waterbury | 126/271.3 |
| 1,707,845 | 4/1929 | Caswell | 126/271.2 A |
| 1,826,232 | 10/1931 | Young | 126/271.3 |
| 1,943,218 | 1/1934 | Gruttoomson | 126/271.3 |
| 2,225,207 | 12/1940 | Cluff | 126/271.1 |
| 3,174,477 | 3/1965 | Wilson | 126/271.3 |

FOREIGN PATENTS OR APPLICATIONS

| | | | |
|---|---|---|---|
| 84,568 | 8/1920 | Switzerland | 126/271.3 |
| 6,957 | 4/1927 | Australia | 126/271.3 |
| 263,576 | 3/1929 | Italy | 126/271.3 |

Primary Examiner—John J. Camby
Assistant Examiner—Henry C. Yuen
Attorney, Agent, or Firm—Rummler & Snow

[57] ABSTRACT

A wheeled device for burning weeds or melting snow and ice having a grate suspended from and positioned forward of the axle, a fan or blower positioned above the grate for forcing air through the fire and grate downwardly, and a handle for moving the device.

4 Claims, 4 Drawing Figures

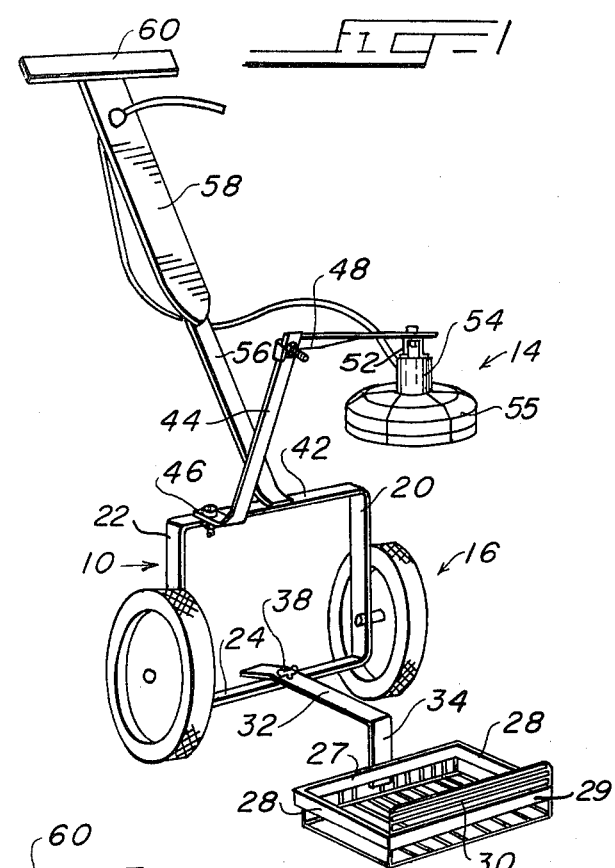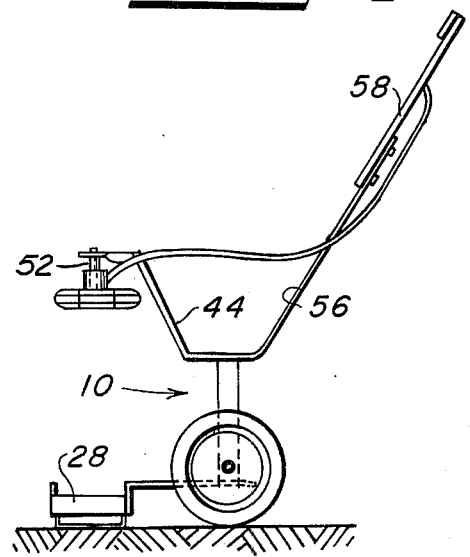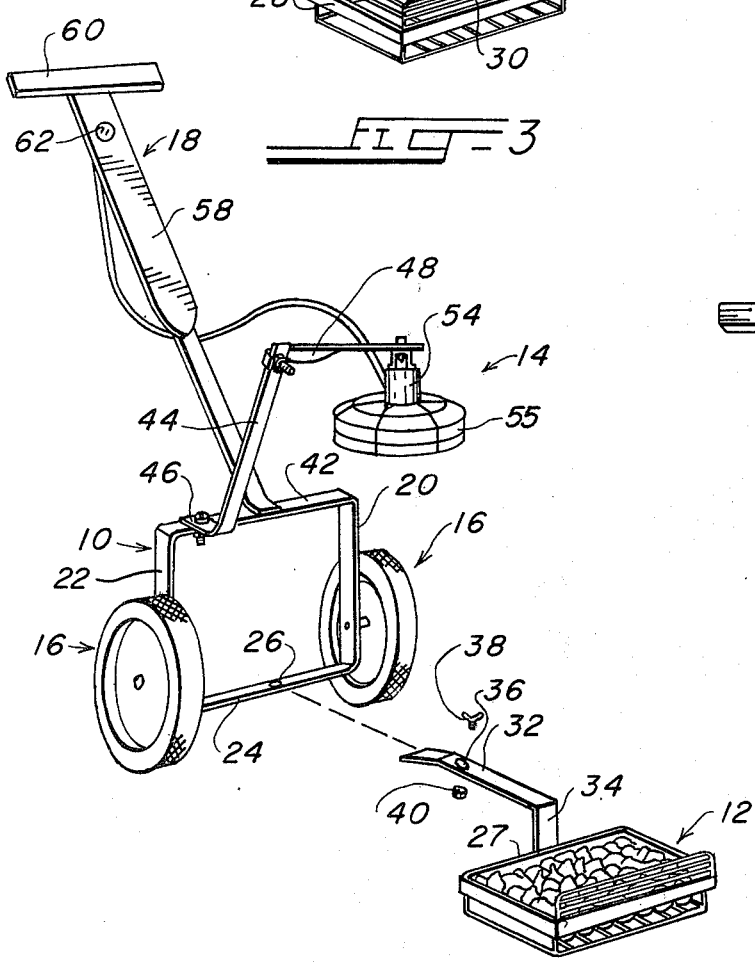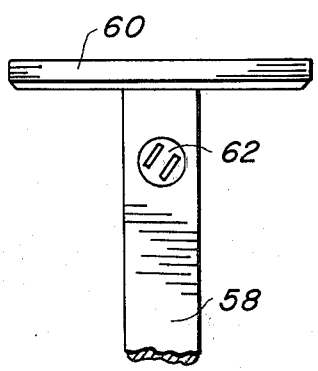

BURNER

BACKGROUND OF THE INVENTION

Weeds are a tenaceous plant which are extremely hard to eradicate except by the use of chemicals. Use of chemicals is dangerous to animals, hence not employed where they are present. The art has weed burners therein but they are extremely difficult to operate, contain no wheels, and have no forced air blowing therethrough. A patentability search disclosed only three patents, i.e. U.S. Pat. Nos. 1,826,232, 1,943,218 and 2,454,365 in Class 47, Sub. 1.44, and Class 126, Subs. 271.1, 271.2 and 271.3.

SUMMARY OF THE INVENTION

A weed burner wherein the grate is suspended ahead of and secured to the lower leg of a rectangular-like frame, the frame having a pair of wheels, each secured to a vertical arm of the frame, a fan suspended above the grate and fastened to the upper leg of the frame member, and a handle to propel the unit.

BRIEF DESCRIPTION OF THE DRAWINGS

FIG. 1 is a perspective view of the device of the present invention;

FIG. 2 is a side elevational view;

FIG. 3 is a perspective view with the grate in unattached position; and

FIG. 4 is an enlarged front elevational view of the upper portion of the handle member showing the electric plug thereon.

DETAILED DESCRIPTION OF THE DRAWINGS

The rectangular frame member 10, preferably made of narrow flat aluminum stock, supports the grate member 12, the fan 14, the wheels 16, and the handle 18.

The wheels 16 are rotatably mounted, one on each vertical leg 20–22, adjacent the lower horizontal leg 24.

The lower horizontal leg 24 is drilled medially of the vertical legs as at 26 to form an aperture.

The grate 12, constructed of high temperature metal such as steel rods, has upstanding side and front walls 28–29, respectively, and a rear wall 27, which support the rods 30. A portion of the rods extends upwardly above the front walls 28 as at 31, while the major portion of the grate rods are suspended below the walls 27, 28 and 29. An elongated bar 32 has its forward portion bent at right angles as at 34. The lower end of the right angled bar 34 is secured to the rear wall 27 medially of the side walls 28 by any suitable means, such as by welding, whereby to support the grate. The other end of bar 32 is drilled as at 36 to form an aperture whereby when the bar 32 is placed on the lower leg 24, as shown in the drawings, the apertures 26 and 36 will be aligned to receive the shank of the thumb screw 38. A nut 40 is run upon the screw 38 to removably secure the arm 32 and its appendages rigidly to the lower leg 24 of the frame.

The upper horizontal leg 42 of frame 10 supports a bracket 44 for mounting the fan 14 and suspending the fan or blower over the grate 12. The distance between the grate and the blower is preferably about 17 or 18 inches.

The bracket 44 has a horizontal portion 46 which is mounted to the frame 16 on the upper leg 42 adjacent the vertical leg 21 by any suitable means, such as by welding, etc. A second short bracket 48 extends at right angles to the bracket 44 and has one end bent at a right angle to bear against the side edge of bracket 44 to assist in preventing turning of arm 48, as the portion adjacent said right angle is secured to the free end of bracket 44 by any suitable means, such as by a bolt 50. The bracket 48 is given a half twist whereby the free end (the right end shown in the drawings) may lie flat against the upper leg of the motor bracket 52 which partially surrounds the motor 54 fan guard 55, in which the fan blades rotate, secured to the motor bracket in the usual manner. The fan blades, of course, are secured to the motor shaft as customary.

One end of the handlebar 56 is secured medially of the ends of the upper leg 42 of the frame 10. The other end of the bar 56 is secured in any suitable manner to a wooden extension 58, which acts as an insulator to keep any heat from being transmitted through the metal parts to the cross bar 60.

An electric outlet 62 is incorporated adjacent the upper end of the extension 58 with appropriate wires 60 running therefrom to the motor 54 whereby when an extension cord is plugged in the outlet and, of course, the other end is connected to a source of current, the motor is energized, rotating the fan blades and blowing or moving air to and through the grate.

In normal use, I propose to use charcoal briquets, but possibly other forms of solid or semi-solid fuels may be used.

In using the device of the present invention, the grate is preferably detached from the frame by removing the thumb screw 38. The grate is moved to a location free of combustible material. Charcoal briquets are placed therein, sprinkled with starter fluid, and then lit. When the flames have subsided, the grate again is secured to the frame 10 and the motor is energized. When the briquets are a bright red color, the device is wheeled to the area of weeds which are to be burned. By merely pushing downwardly on the cross bars 60, the angle of inclination of the grate is varied.

The blower, being positioned directly above the mass of red hot briquets, sends a column of rapidly moving air downward and through the interstices in the briquet mass. The air, in coursing through the briquet mass, attains the same temperature as the briquets and in emerging, burns or destroys weeds. It is believed that the abundant oxygen supplied by the great quantity of rapidly moving air causes the high temperature.

It should be understood that as the original briquets are burned away, an additional supply may be added as the device is in operation.

Although the device has been described as being used for burning weeds, it should be obvious the device may just as easily melt snow and ice, if desired. Also, any kind of power may be used to energize the motor or the blower.

Although but one specific embodiment of this invention is herein shown and described, it will be understood that details of the construction shown may be altered or omitted without departing from the spirit of the invention as defined by the following claims.

I claim:

1. A portable burner for burning weeds or melting ice and snow comprising:
   a. a frame of substantially rectangular shape having vertically disposed side legs and horizontally disposed lower and upper legs with the upper leg positioned above and spaced from the lower and in alignment therewith,
b. a grate open to the atmosphere extending forward of and depending from said lower leg, and having side, end and front walls and spaced grate rods extending below from said walls and secured thereto,
c. a blower extending outwardly of and suspended from said upper leg of said frame and positioned over and above said grate in alignment therewith,
d. an insulated handle secured to and extending rearwardly and upwardly from said upper leg of said frame,
e. means to energize said blower, and
f. rotatable means on said side legs of said frame whereby said device is portable.

2. The device according to claim 1 wherein said grate comprises a series of spaced rods secured to and depending from said grate walls.

3. The device according to claim 1 wherein the grate is provided with a rearwardly extending bar which is removably secured to the lower leg of said frame.

4. The device according to claim 1 wherein the blower is a motor and a fan blade, and said rotatable means on said frame has wheels positioned one on each side leg of said frame.

* * * * *